(12) United States Patent
McCollum

(10) Patent No.: US 10,644,275 B2
(45) Date of Patent: May 5, 2020

(54) FRONT ACCESS BATTERY TRAY AND BATTERY STORAGE SYSTEM

(71) Applicant: Toshiba International Corporation, Houston, TX (US)

(72) Inventor: William L. McCollum, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 15/782,880

(22) Filed: Oct. 13, 2017

(65) Prior Publication Data

US 2019/0115570 A1 Apr. 18, 2019

(51) Int. Cl.
| | | |
|---|---|---|
| *H01M 2/10* | (2006.01) | |
| *B65D 85/30* | (2006.01) | |
| *B65D 21/02* | (2006.01) | |
| *B65D 25/00* | (2006.01) | |

(52) U.S. Cl.
CPC .......... *H01M 2/10* (2013.01); *B65D 21/0212* (2013.01); *B65D 21/0213* (2013.01); *B65D 25/005* (2013.01); *B65D 85/30* (2013.01); *B65D 2585/88* (2013.01)

(58) Field of Classification Search
CPC .... B65D 85/30; B65D 21/0213; B65D 21/00; B65D 19/00; B65D 1/22; B65D 21/02; B65D 21/0212; B65D 25/005; B65D 2585/88; H01M 2/10; H01M 2/00
USPC ....... 206/703, 509, 505, 508, 503, 501, 506, 206/245; 220/700, 702, 710, 727, 729, 220/730, 764, 768, 345.4, 4.31, 345.1, 220/3.8; 211/87.01, 88.01; 429/99; 174/559–563

See application file for complete search history.

(56) References Cited

U.S. PATENT DOCUMENTS

| | | | | |
|---|---|---|---|---|
| 3,944,073 | A * | 3/1976 | Downing | B65D 21/0224 206/503 |
| 4,782,977 | A * | 11/1988 | Watanabe | B65D 55/024 220/324 |
| 7,866,504 | B2 * | 1/2011 | Okada | B60R 7/04 220/345.1 |
| 8,960,469 | B1 * | 2/2015 | Helal | B65D 21/0204 220/23.6 |
| 8,980,456 | B2 * | 3/2015 | Insana | H01M 2/1077 429/72 |
| 2004/0099563 | A1 * | 5/2004 | Otting | B65D 21/048 206/503 |
| 2005/0058891 | A1 * | 3/2005 | Marraffa | H01M 2/1077 429/99 |

(Continued)

*Primary Examiner* — Bryon P Gehman
(74) *Attorney, Agent, or Firm* — Baker Botts L.L.P.

(57) ABSTRACT

In accordance with presently disclosed embodiments, a front access battery tray is provided. In one embodiment, the front access battery tray comprises a base having a front edge, two side edges, and a back edge; a pair of side panels extending substantially perpendicularly from the side edges of the base, each side panel comprising a top edge and an outer surface, wherein at least one retainer peg extends away from each outer surface; a pair of flanges extending from the top edge of each side panel, each flange comprising an inner lip; a back panel extending substantially perpendicularly from the back edge of the base; and a retainer bracket detachably coupled to at least one of the retainer pegs on the side panels.

15 Claims, 10 Drawing Sheets

(56) References Cited

U.S. PATENT DOCUMENTS

| | | |
|---|---|---|
| 2006/0147794 A1 | 7/2006 | Hakunti et al. |
| 2010/0294721 A1 | 11/2010 | Frazier et al. |
| 2013/0244075 A1 | 9/2013 | Lentine, Jr. et al. |
| 2013/0248437 A1 | 9/2013 | Frazier et al. |
| 2014/0113165 A1 | 4/2014 | Silk et al. |
| 2014/0134460 A1 | 5/2014 | Youn |
| 2015/0380698 A1 | 12/2015 | Springauf et al. |
| 2017/0133641 A1 | 5/2017 | Lee |
| 2017/0133642 A1 | 5/2017 | Lee |

* cited by examiner

FRONT ACCESS BATTERY TRAY AND BATTERY STORAGE SYSTEM

TECHNICAL FIELD

Embodiments of the present disclosure relate to battery storage and, more particularly, to a scalable and configurable front access battery tray and battery storage system.

BACKGROUND

Back-up power sources maintain operations when the primary source shuts down. These systems may comprise a plurality of lithium ion battery modules which are typically connected together in modules. Typically, these batteries are supported in battery rack systems. In some instances, space requirements for the battery trays are tight and assembly and mounting of the rack system in these confined areas is difficult and time consuming.

SUMMARY

In accordance with the above, presently disclosed embodiments are directed to configurable and scalable front access battery trays and battery storage system.

In some embodiments, a front access battery tray may comprise a base having a front edge, two side edges, and a back edge; a pair of side panels extending substantially perpendicularly from the side edges of the base, each side panel comprising a top edge and an outer surface, wherein at least one retainer peg extends away from each outer surface; a pair of flanges extending from the top edge of each side panel, each flange comprising an inner lip; a back panel extending substantially perpendicularly from the back edge of the base; and a retainer bracket detachably coupled to at least one of the retainer pegs on the side panels.

In certain embodiments, a battery storage system comprises a first front access battery tray, comprising a first base having a first front edge, two first side edges, and a first back edge; a pair of first side panels extending substantially perpendicularly from the first side edges of the base, each first side panel comprising a first top edge and a first outer surface, wherein at least one first retainer peg extends away from each first outer surface; a pair of first flanges extending from the first top edge of each first side panel, each first flange comprising a first inner lip; a first back panel extending substantially perpendicularly from the first back edge of the first base; and a first retainer bracket detachably coupled to at least one of the first retainer pegs; and a second front access battery tray, comprising a second base having a second front edge, two second side edges, and a second back edge; a pair of second side panels extending substantially perpendicularly from the second side edges of the base, each second side panel comprising a second top edge and a second outer surface, wherein at least one second retainer peg extends away from each second outer surface; a pair of second flanges extending from the second top edge of each second side panel, each second flange comprising a second inner lip; a second back panel extending substantially perpendicularly from the second back edge of the second base; and a second retainer bracket detachably coupled to at least one of the second retainer pegs, wherein at least a portion of the second front access battery tray rests on each first flange.

BRIEF DESCRIPTION OF THE DRAWINGS

For a more complete understanding of the present disclosure and its features and advantages, reference is made to the following description, taken in conjunction with the accompanying drawings, in which.

DETAILED DESCRIPTION

Illustrative embodiments of the present disclosure are described in detail herein. In the interest of clarity, not all features of the actual implementation are described in this specification. It will of course be appreciated that in the development of any such embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of this disclosure. Furthermore, in no way should the following examples be read to limit or define the scope of the disclosure.

Among the many potential advantages to the apparatus of the present disclosure, only some of which are alluded to herein, the apparatus of the present disclosure may provide a front access battery tray that is configurable, scalable, easily accessible, and has a small footprint. The design of the front access battery tray allows easy access for installation and service of battery modules while still providing stable and secure battery storage. The size of the front access battery trays may be configured based on the type of and number of battery modules to be stored. The front access battery trays may be stacked, allowing for quick setup and scalability. Additionally, the compact design of the front access battery tray allows for a versatile battery storage solution that works even in confined spaces.

Figure 1:
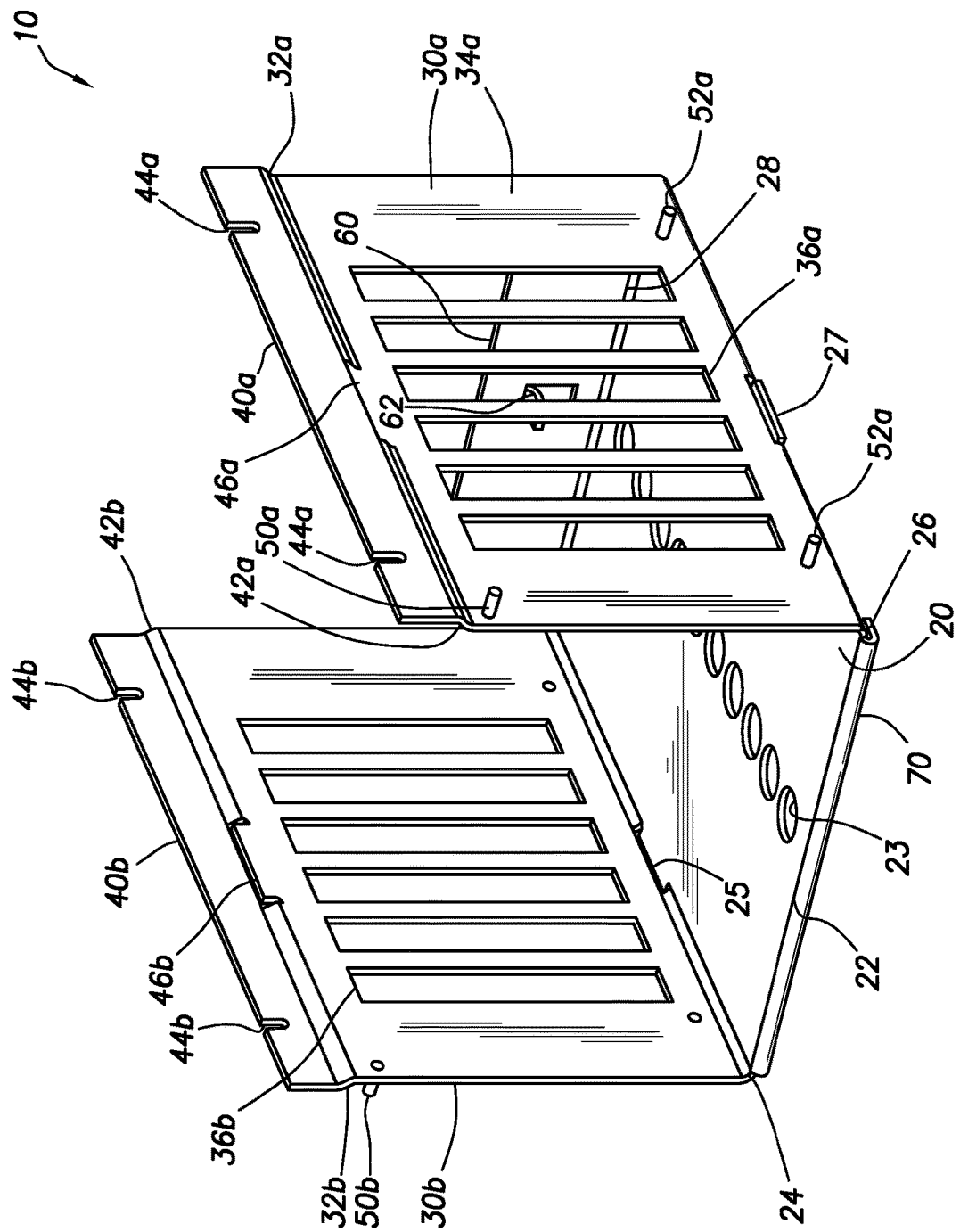
FIG. 1 is a perspective view of a front access battery tray according to certain embodiments of the present disclosure.
Figure 2:
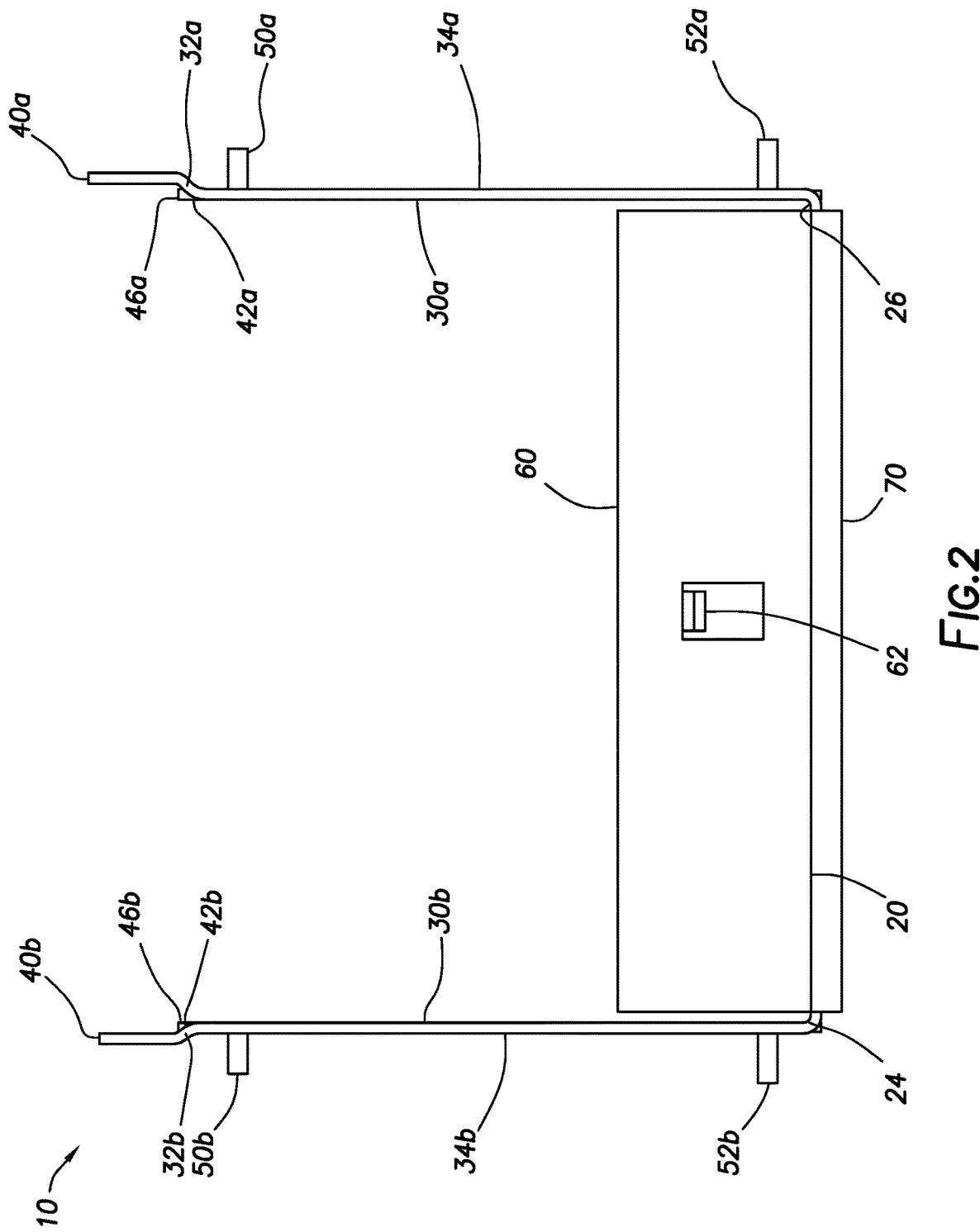
FIG. 2 is a front view of a front access battery tray according to certain embodiments of the present disclosure.
Figure 3:
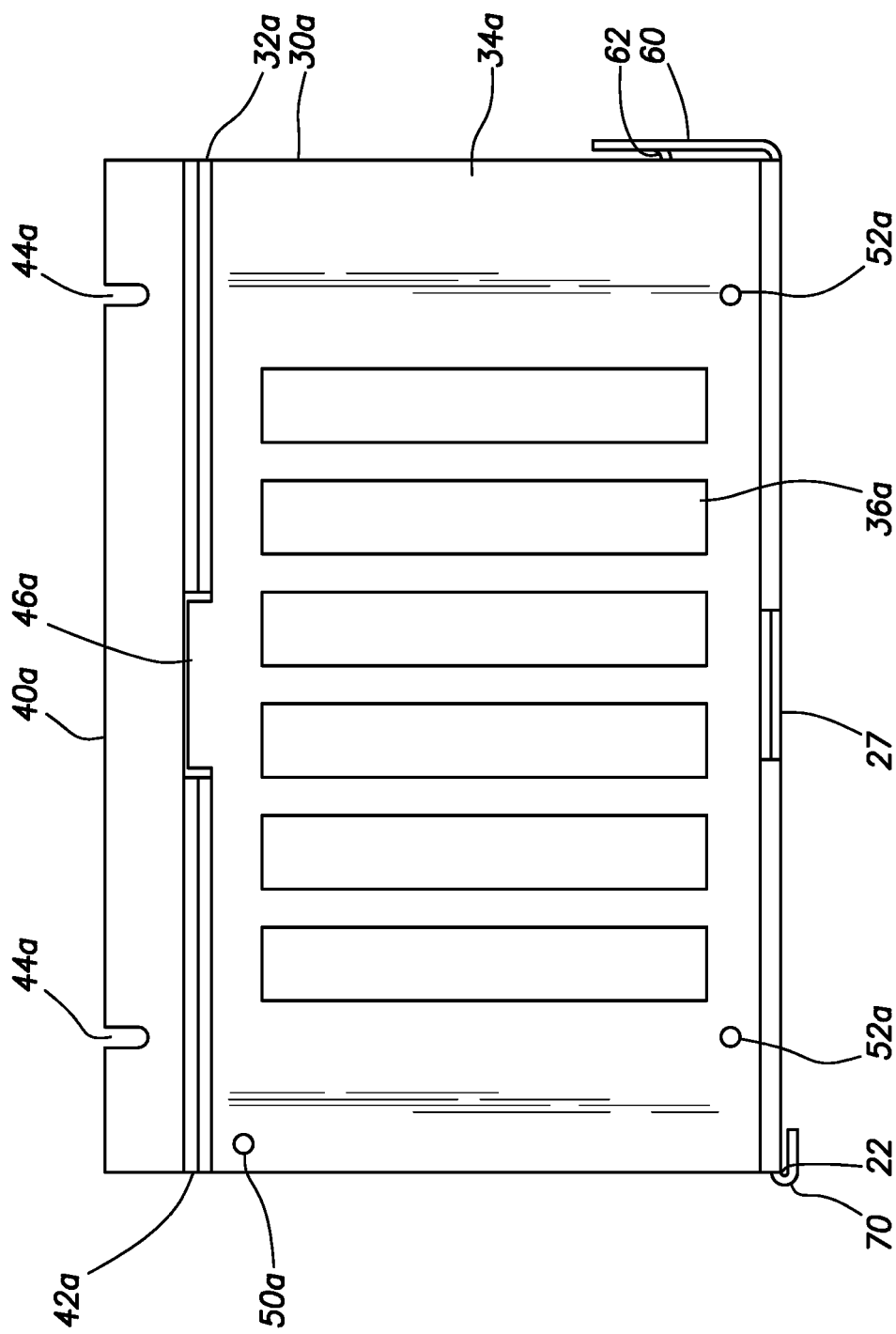
FIG. 3 is a side view of a front access battery tray according to certain embodiments of the present disclosure.

Turning now to the drawings, FIGS. 1-3 illustrate an embodiment of a front access battery tray 10 comprising a base 20, side panels 30a, 30b, flanges 40a, 40b, and a back panel 60. The base 20 may comprise a front edge 22, two side edges 24, 26, and a back edge 28. In certain embodiments, the base 20 is rectangular or square. In some embodiments, the base 20 may comprise a plurality of base openings 23, which may be circular, rectangular, or any other suitable shape. The side edges 24, 26 may comprise stacking slots 25, 27.

The side panels 30a, 30b may each comprise a top edge 32a, 32b and an outer surface 34a, 34b. In certain embodiments, the side panels 30a, 30b may extend substantially perpendicularly from the side edges 24, 26 of the base 20. As used herein, "substantially perpendicularly from" means oriented from about 75° to about 105° relative to the reference surface. In some embodiments, the side panels 30a, 30b may comprise one or more side panels openings 36a, 36b, which may be rectangular, circular, or any other suitable shape. In some embodiments, the front access battery tray 10 comprises a front lip 70 that extends from the front edge 22 of the base 20 and curves back underneath the base 20.

Retainer pegs 50a, 50b may extend away from the outer surfaces 34a, 34b. Although the retainer pegs 50a, 50b are depicted as cylindrical, in certain embodiments, the retainer pegs 50a, 50b may comprise a plank, rod, arm, member, platform, strut, truss, and/or any other suitable structure. In some embodiments, the retainer pegs 50a, 50b may extend substantially perpendicularly away from the outer surfaces 34a, 34b. Although shown near the top edge of the side panels 30a, 30b and spaced opposite the back panel 60, retainer pegs 50a, 50b may be located in any suitable position on the side panels 30a, 30b. Mounting pegs 52a, 52b may extend away from the outer surfaces 34a, 34b. In some embodiments, the mounting pegs 52a, 52b may extend substantially perpendicularly away from the side panels 30a, 30b. While mounting pegs 52b are not visible in FIG. 1, they are shown in FIG. 2. Although the mounting pegs 52a, 52b are depicted as cylindrical, in certain embodiments, the mounting pegs 52a, 52b may comprise a plank, rod, arm, member, platform, strut, truss, and/or any other suitable structure. Although the mounting pegs 52a, 52b are depicted as spaced apart and located near the bottom of the side panels 30a, 30b, they also could be close together, and could be located at any suitable position on the outer surface 34a, 34b.

Figure 8:
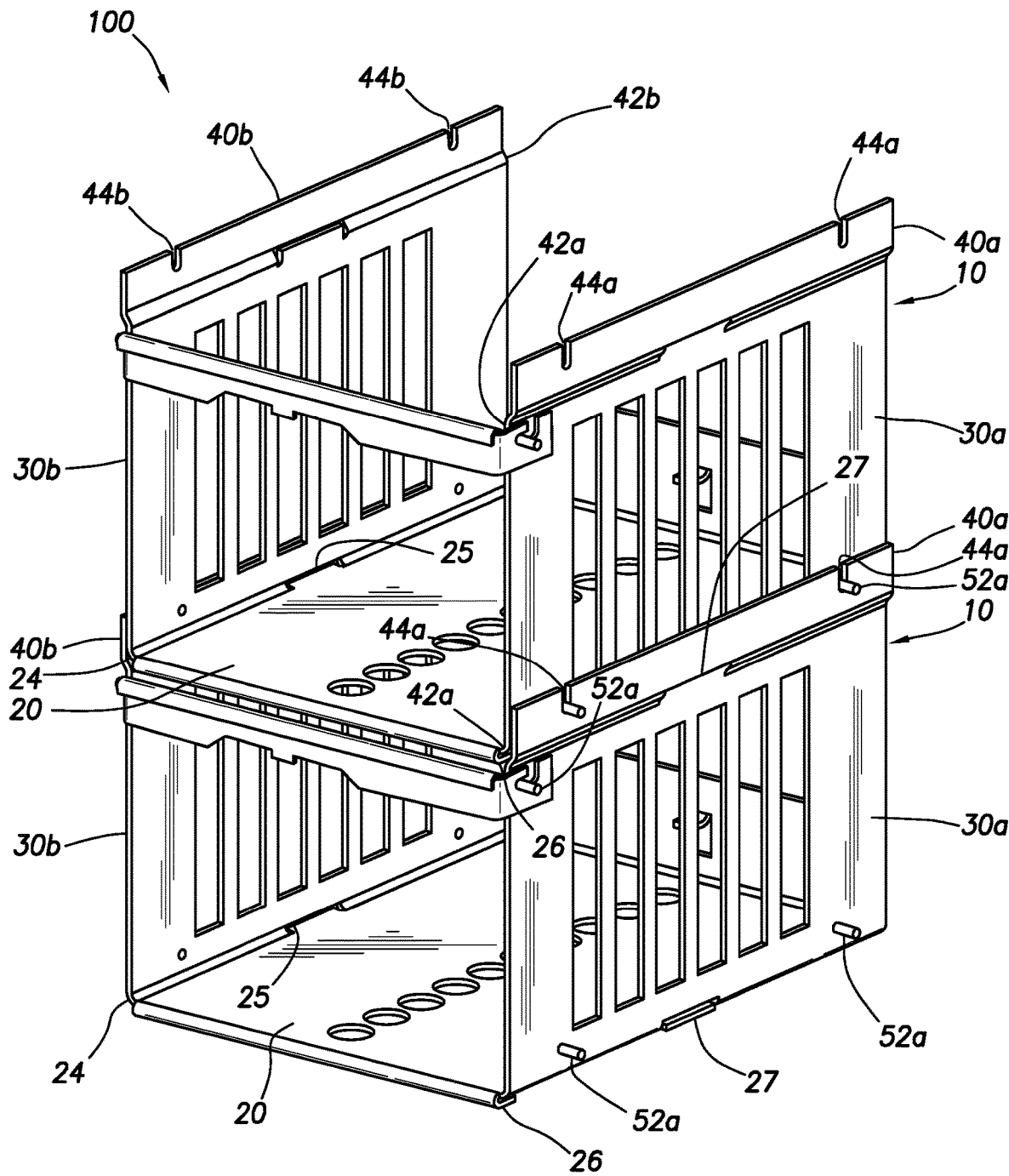
FIG. 8 is a perspective view of a battery storage system according to certain embodiments of the present disclosure.
Figure 9:
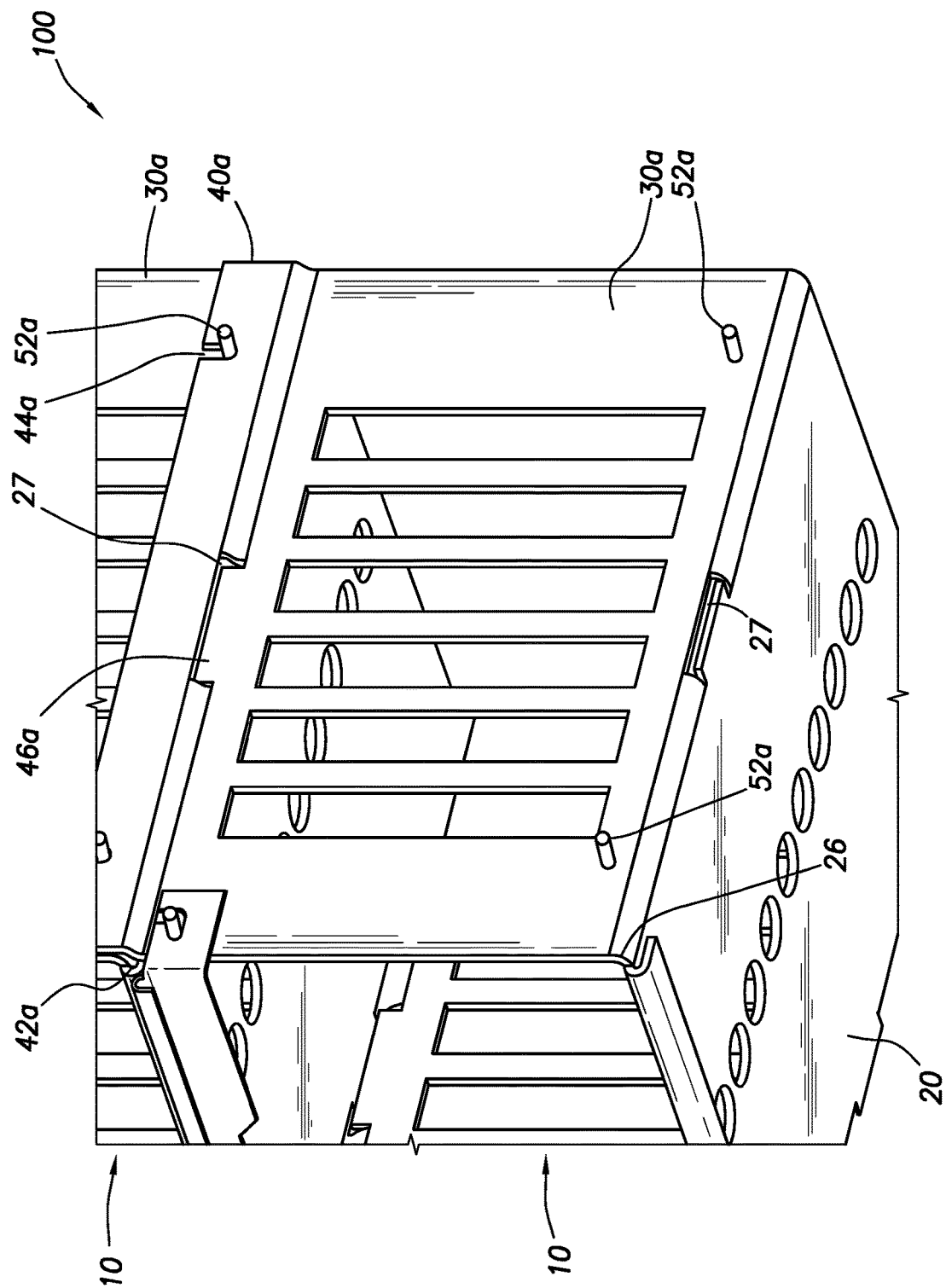
FIG. 9 is a perspective view of a portion of a battery storage system according to certain embodiments of the present disclosure.
Figure 10:
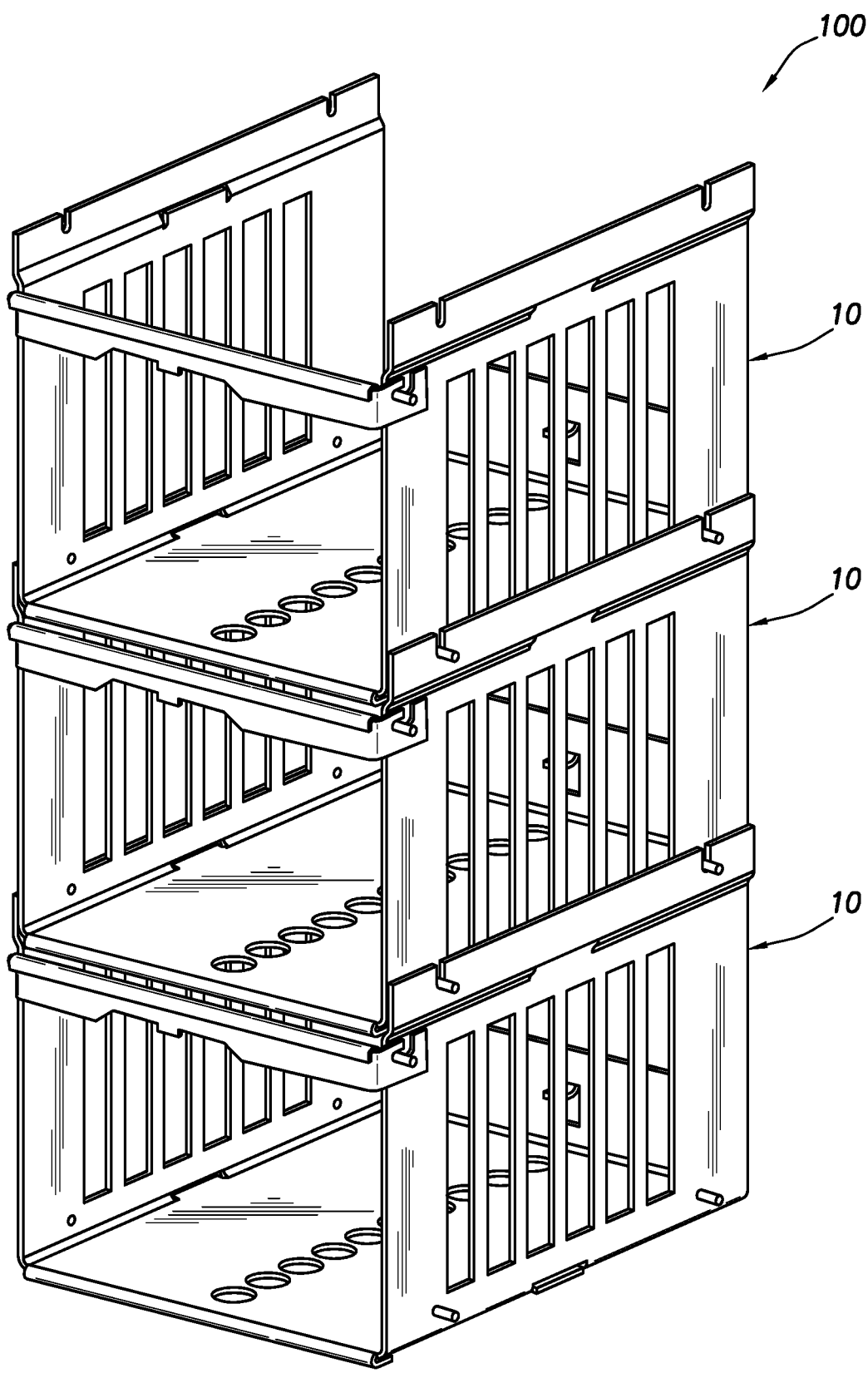
FIG. 10 is a perspective view of a portion of a battery storage system according to certain embodiments of the present disclosure.

Flanges 40a, 40b may extend from the top edges 32a, 32b of the side panels 30a, 30b and may comprise an inner lip 42a, 42b. In certain embodiments, each inner lip 42a, 42b is configured to support a second front access battery tray (as depicted in FIGS. 8-10). For example, in certain embodiments, each inner lip 42a, 42b is configured to support at least a portion of another front access battery tray (as depicted in FIGS. 8-10). Each flange 40a, 40b may comprise at least two mounting peg receiving channels 44a, 44b. Although the mounting peg receiving channels 44a, 44b are depicted as U-shaped, they may be any shape suitable to engage with the mounting pegs 52a, 52b. In certain embodiments, the mounting peg receiving channels 44a, 44b are configured to receive and/or engage with the mounting pegs 52a, 52b of a second front access battery tray. Stacking tabs 46a, 46b may protrude from the inner lip 42a, 42b of the flanges 40a, 40b. In some embodiments, stacking tabs 46a, 46b may be configured to engage with the stacking slots 25, 27 of a second front access battery tray. In some embodiments, the stacking slots 25, 27 may be configured to receive stacking tabs 46a, 46b from a second front access battery tray. In certain embodiments, the stacking tabs 46a, 46b may be located at or near the center of the inner lip 42a, 42b.

The back panel 60 may extend substantially perpendicularly from the back edge 28 of the base 20. In some embodiments, the back panel 60 may be configured to engage with one or more battery modules. In certain embodiments, the back panel 60 may comprise means 62 for securing one or more battery modules in the front access battery tray 10. Such means 62 may comprise a latch, notch, tab, or other suitable means for engaging with a battery module (not shown).

Figure 4:
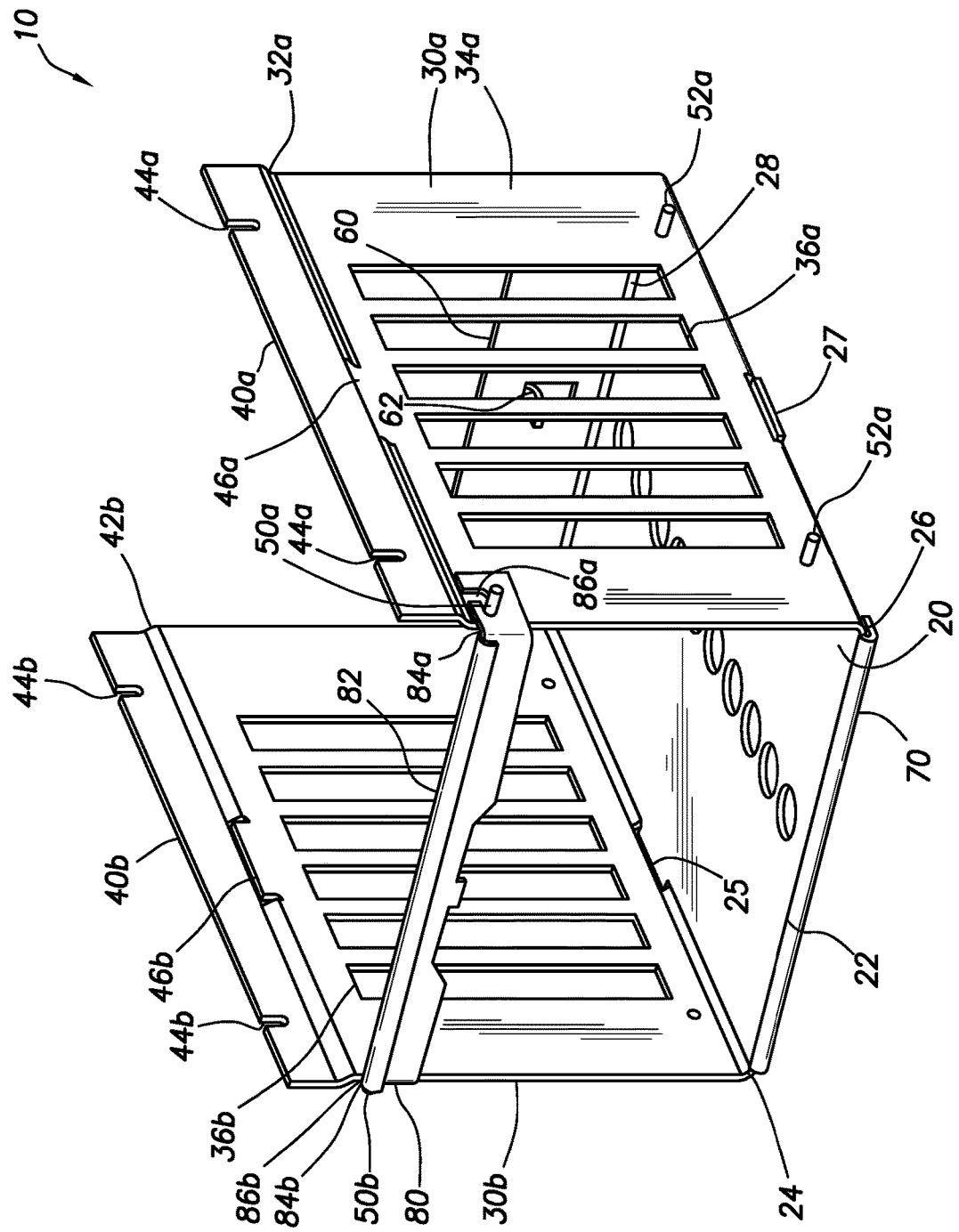
FIG. 4 is a perspective view of a front access battery tray having a retainer bracket according to certain embodiments of the present disclosure.
Figure 5:
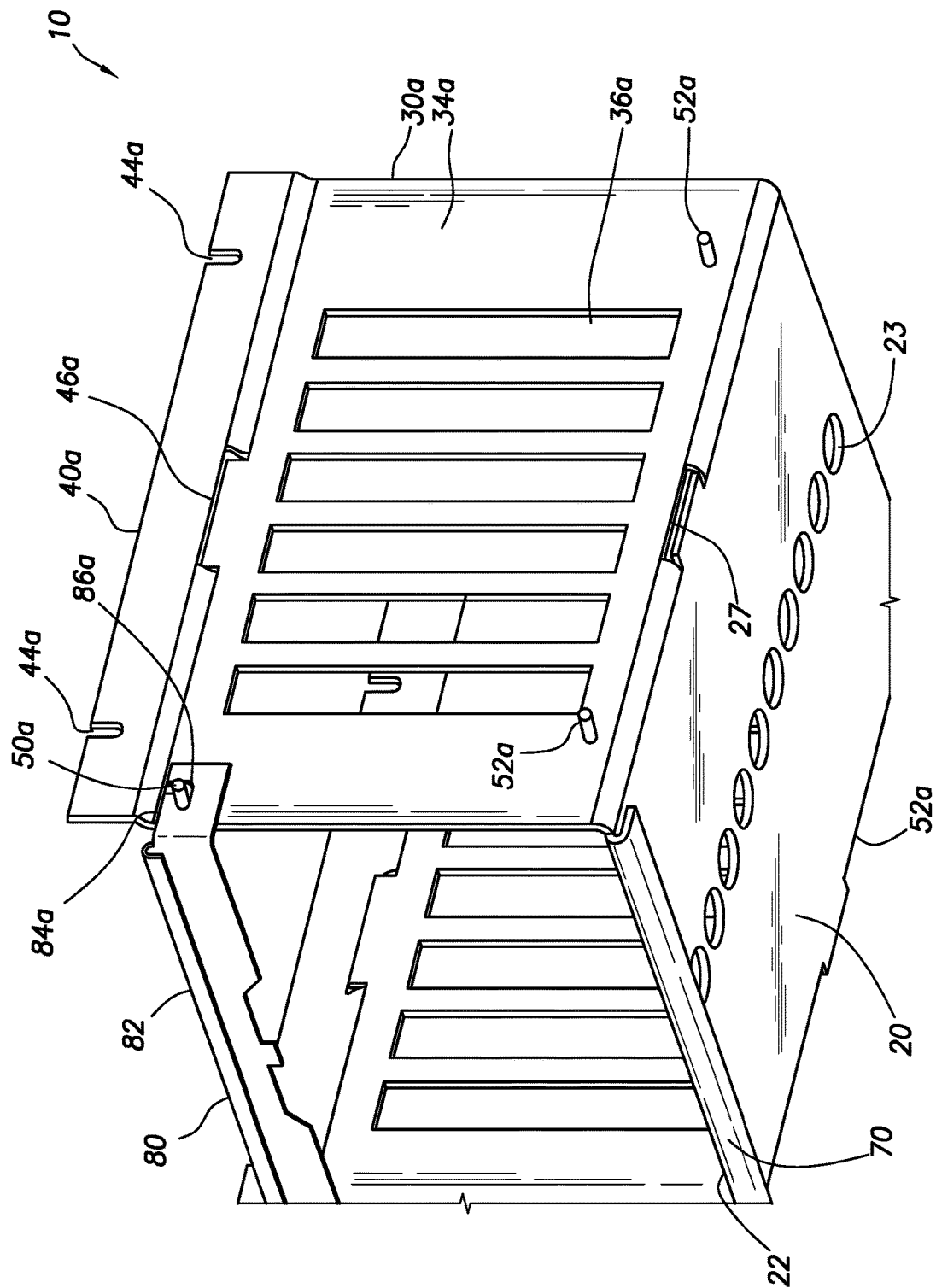
FIG. 5 is a perspective view of a portion of a front access battery tray having a retainer bracket according to certain embodiments of the present disclosure.
Figure 6:
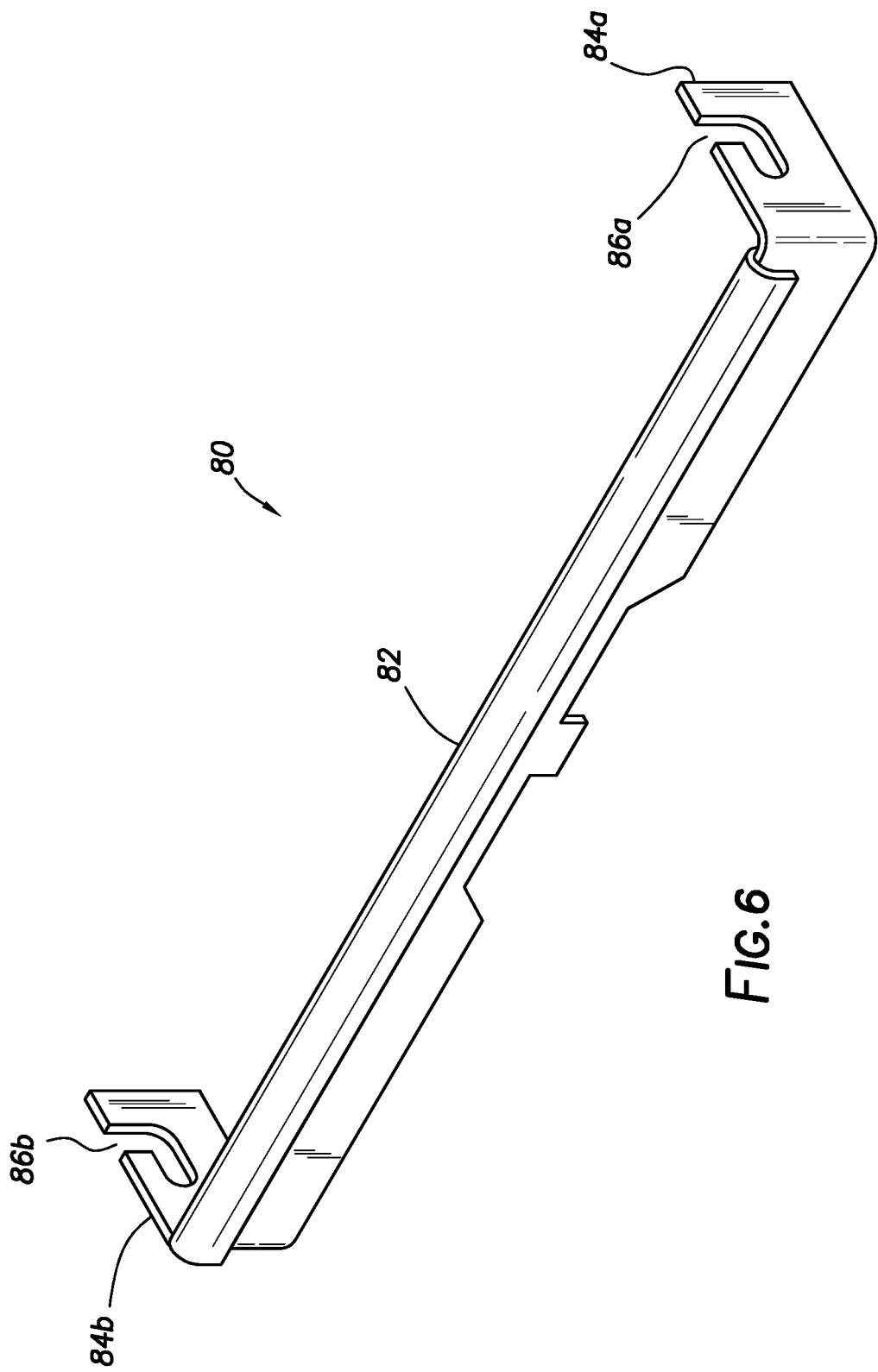
FIG. 6 is a perspective view of a retainer bracket according to certain embodiments of the present disclosure.
Figure 7:
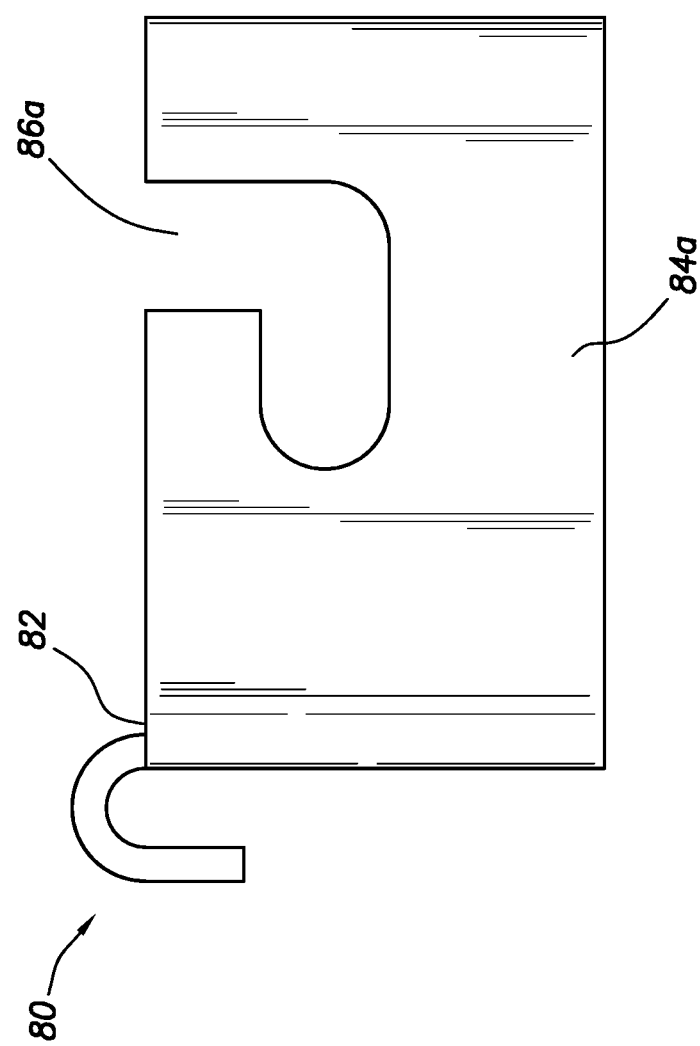
FIG. 7 is a side view of a retainer bracket according to certain embodiments of the present disclosure.

FIGS. 4-5 depict an embodiment of the front access battery tray 10 comprising a retainer bracket 80. The retainer bracket 80 is shown in further detail in FIGS. 6-7. The retainer bracket 80 may comprise a center portion 82 and two side portions 84a, 84b. In some embodiments, the retainer bracket 80 spans the two side panels 30a, 30b. The side portions 84a, 84b may be detachably coupled to retainer pegs 50a, 50b on the side panels 30a, 30b. In some embodiments, the side portions may comprise a retainer receiving channel 86a, 86b configured to receive and/or engage with the retainer pegs 50a, 50b. In some embodiments, the retainer bracket 80 may be configured to secure one or more battery modules (not shown) within the front access battery tray 10. In certain embodiments, the retainer bracket 80 may provide a barrier to keep a battery module secured within the front access battery tray 10. In certain embodiments, the retainer bracket 80 may be coupled to one or more battery modules.

In some embodiments, the front access battery tray 10 may comprise fasteners, including, but not limited to bolts, nuts, rivets, and screws. In some embodiments, the front access battery tray 10 may not comprise any fasteners other than the mounting pegs 52a, 52b and retainer pegs 50a, 50b.

As shown in FIGS. 8-10, two or more front access battery trays 10 may be stacked to create a battery storage system 100. In certain embodiments, the battery storage system 100 may be modular, and battery trays 10 may be added or removed as needed. In some embodiments, two or more, three or more, four or more, or five or more battery trays 10 may be stacked to form a battery storage system 100. In some embodiments, the battery storage system 100 may be freestanding and not require any mounting or external support. In certain embodiments, the battery storage system 100 may be mounted, installed, or otherwise coupled to a bottom bracket, top bracket, or cabinet (not shown). In some embodiments, the battery storage system 100 may comprise fasteners coupling one or more front access battery trays 10, including, but not limited to bolts, nuts, rivets, and screws. In some embodiments, the battery storage system 100 may not comprise any fasteners. In certain embodiments, the battery storage system 100 is self-supporting and does not require fasteners for support or stability.

With reference to FIGS. 8 and 9, a front access battery tray 10 may rest on top of another front access battery tray 10. In certain embodiments, at least a portion of a front access battery tray 10 may rest on the flanges 40a, 40b of another front access battery tray 10. In some embodiments, at least a portion of the side edges 24, 26, the base 20, and/or the side panels 30a, 30b of a front access battery tray 10 may rest on the flanges 40a, 40b of another front access battery tray 10. In some embodiments, at least a portion of the side edges 24, 26, the base 20, and/or the side panels 30a, 30b of a front access battery tray 10 may rest on the inner lips 42a, 42b of another front access battery tray 10. This may provide support for the the front access battery trays 10, allowing battery modules to be stored in the front access battery trays 10 and allowing additional front access battery trays 10 to be stacked in a similar manner, as shown in FIG. 10. In some embodiments, further support is provided by mounting pegs 52a, 52b of a front access battery tray 10 engaging with mounting peg receiving channels 44a, 44b on another front access battery tray 10. The engagement of the mounting pegs 52a, 52b with the mounting peg receiving channels 44a, 44b may stabilize the battery storage system 10 and reduce lateral movement. In some embodiments, the stacking tabs 46a, 46b of a front access battery tray 10 may engage with the stacking slots 25, 27 of another front access battery tray 10, which may also stabilize and reduce lateral movement of the battery storage system 100.

The front access battery trays 10 may be configured to store various numbers and types of battery modules. In some embodiments, the front access battery trays may be configured to store lithium batteries. In certain embodiments, each front access battery tray is configured to store a number of battery modules, including, but not limited to one battery module, two battery modules, three battery modules, or four battery modules.

Although the present disclosure and its advantages have been described in detail, it should be understood that various changes, substitutions and alterations can be made herein without departing from the spirit and scope of the disclosure as defined by the following claims.

What is claimed is:

1. A battery tray comprising:
a base having a front edge, two side edges, and a back edge;
a pair of side panels extending substantially perpendicularly from the side edges of the base, each side panel comprising a top edge and an outer surface, wherein at least one retainer peg is located near the top edge of the side panel and extends away from the outer surface;
at least two mounting pegs extending away from each respective outer surface, wherein the at least two mounting pegs are spaced apart and located on bottom portions of the side panels;
a flange extending from the top edge of each respective side panel in a direction parallel to the side panel, wherein each flange comprises:
an inner lip, wherein each inner lip is disposed between the flange and the side panel;
at least two mounting peg receiving channels; and
a stacking tab protruding from the inner lip, wherein the stacking tab protrudes parallel in relation to the base;
a back panel extending substantially perpendicularly from the back edge of the base; and
a retainer bracket detachably coupled to at least one of the retainer pegs on the side panels.

2. The battery tray of claim 1, wherein each side edge comprises a stacking slot.

3. The battery tray of claim 1, wherein each side panel comprises a plurality of rectangular openings.

4. The battery tray of claim 1, further comprising a front lip that extends from the front edge of the base and curves underneath the base.

5. The battery tray of claim 1, wherein the base comprises a plurality of openings.

6. The battery tray of claim 1, wherein the side portions of the retainer bracket each comprise a retainer receiving channel configured to receive one of the retainer pegs.

7. The battery tray of claim 1, wherein the retainer bracket comprises a center portion extending between two side portions and each side portion is detachably coupled to at least one of the retainer pegs on the side panels.

8. The battery tray of claim 1, wherein the back panel is configured to engage with one or more battery modules.

9. The battery tray of claim 1, wherein the retainer bracket is configured to secure one or more battery modules within the battery tray.

10. A battery storage system comprising:
a first front access battery tray, comprising:
a first base having a first front edge, two first side edges, and a first back edge;
a pair of first side panels extending substantially perpendicularly from the first side edges of the base, each first side panel comprising a first top edge and a first outer surface, wherein at least one first retainer peg is located near the top edge of the first side panel and extends away from the first outer surface;
a first flange extending from the respective first top edge of each first side panel in a direction parallel to its respective first side panel, wherein each first flange comprises:
a first inner lip, wherein the first inner lip is disposed between its corresponding flange and the first side panel,
at least two first mounting peg receiving channels; and
a first stacking tab protruding from the first inner lip, wherein the first stacking tab protrudes parallel in relation to the first base;
a first back panel extending substantially perpendicularly from the first back edge of the first base;
at least two mounting pegs extending away from each respective first outer surface, wherein the at least two mounting pegs are spaced apart and located on bottom portions of the first side panels; and
a first retainer bracket detachably coupled to at least one of the first retainer pegs; and
a second front access battery tray, comprising:
a second base having a second front edge, two second side edges, and a second back edge;
a pair of second side panels extending substantially perpendicularly from the second side edges of the base, each second side panel comprising a second top edge and a second outer surface, wherein at least one second retainer peg is located near the second top edge of the second side and extends away from the second outer surface;
a second flange extending from the second top edge of each respective second side panel, each second flange comprising a second inner lip;
a second back panel extending substantially perpendicularly from the second back edge of the respective second base;
at least two mounting pegs extending away from each second outer surface, wherein the at least two mounting pegs are spaced apart and located on bottom portions of the second side panels; and
a second retainer bracket detachably coupled to at least one of the second retainer pegs,
wherein the second mounting pegs engage with the first mounting peg receiving channels.

11. The battery storage system of claim 10, wherein at least a portion of the second base rests on the first inner lip of each first flange.

12. The battery storage system of claim 10, wherein at least a portion of one of the second side panels rests on the first inner lip of each first flange.

13. The battery storage system of claim 10, wherein each second side edge comprise a second stacking slot, and the first stacking tabs engage with the second stacking slots.

14. The battery storage system of claim 10, wherein at least two second mounting pegs extend away from each second outer surface, and the second mounting pegs engage with the first mounting peg receiving channels.

15. The battery storage system of claim 10, further comprising a third front access battery tray, wherein at least a portion of the third front access battery tray rests on each second flange.

\* \* \* \* \*